(12) United States Patent
Horie et al.

(10) Patent No.: US 10,769,063 B2
(45) Date of Patent: Sep. 8, 2020

(54) SPIN-LESS WORK-STEALING FOR PARALLEL COPYING GARBAGE COLLECTION

(71) Applicant: INTERNATIONAL BUSINESS MACHINES CORPORATION, Armonk, NY (US)

(72) Inventors: Michihiro Horie, Saitama (JP); Hiroshi Horii, Tokyo (JP); Kazunori Ogata, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 67 days.

(21) Appl. No.: 15/986,299

(22) Filed: May 22, 2018

(65) Prior Publication Data
US 2019/0361805 A1 Nov. 28, 2019

(51) Int. Cl.
*G06F 12/02* (2006.01)
*G06F 9/455* (2018.01)
*G06F 9/48* (2006.01)

(52) U.S. Cl.
CPC ...... *G06F 12/0253* (2013.01); *G06F 9/45533* (2013.01); *G06F 9/4881* (2013.01);
(Continued)

(58) Field of Classification Search
CPC ............. G06F 12/0253; G06F 9/45533; G06F 9/4881; G06F 2212/1028; G06F 2212/1044
See application file for complete search history.

(56) References Cited

U.S. PATENT DOCUMENTS

| 6,427,154 | B1 * | 7/2002 | Kolodner | ............ G06F 12/0269 |
| 7,363,438 | B1 * | 4/2008 | Lev | ........................... G06F 9/52 |
| | | | | 707/999.202 |

(Continued)

OTHER PUBLICATIONS

Hassanein, Wessam, "Understanding and Improving JVM GC Work Stealing at the Data Center Scale", ISMM'16, Jun. 2016, pp. 46-54.

(Continued)

*Primary Examiner* — Glenn Gossage
(74) *Attorney, Agent, or Firm* — Tutunjian & Bitetto, P.C.; Vazken Alexanian

(57) ABSTRACT

Computer-implemented methods, program storage devices, and systems are provided for object copying in a computer performing parallel copying garbage collection on deques using work stealing. A method includes acquiring, for original objects in a source deque space, a destination deque space to copy the original objects to, and copying, from the source deque space to the destination deque space, any original objects in the source deque space having a reference to other ones of the original objects, or having a pre-known structure for estimating copy overhead. The method also includes registering, together with an address to copy to, any original objects in the source deque space lacking the reference to the other ones of the original objects, or lacking the pre-known structure for estimating copy overhead. The method additionally includes setting, in the source space, forwarding pointers to copied ones of the original objects in the destination deque place. The method may further include copying registered objects based on a copy cost or overhead and a spin count, waiting in a spin loop, and trying to steal a task after the spin loop. An upper limit may be imposed on the number of original objects that can be registered to prevent a load balance loss. The parallel copying garbage collection may be performed on a heap of the computer.

25 Claims, 5 Drawing Sheets

(52) U.S. Cl.
CPC ............. *G06F 2212/1028* (2013.01); *G06F 2212/1044* (2013.01)

(56) References Cited

U.S. PATENT DOCUMENTS

| | | | |
|---|---|---|---|
| 8,694,751 B2* | 4/2014 | Siegwart | G06F 12/0276 |
| | | | 711/162 |
| 2003/0212719 A1* | 11/2003 | Yasuda | G06F 12/0276 |
| 2004/0167947 A1 | 8/2004 | Garthwaite | |
| 2005/0132374 A1* | 6/2005 | Flood | G06F 12/0276 |
| | | | 718/100 |
| 2007/0143326 A1* | 6/2007 | Chase | G06F 7/785 |
| 2008/0250089 A1* | 10/2008 | Siegwart | G06F 12/0253 |
| 2009/0031292 A1* | 1/2009 | Fulton | G06F 9/4493 |
| | | | 717/151 |
| 2012/0239901 A1 | 9/2012 | Burka et al. | |
| 2018/0314631 A1* | 11/2018 | Horie | G06F 12/0269 |

OTHER PUBLICATIONS

Gidra, Lokesh, "Garbage Collector for memory intensive applications on NUMA architectures", Docteur de l'Université Pierre Et Marie Curie, Sep. 2015, 83 pages.

* cited by examiner

SPIN-LESS WORK-STEALING FOR PARALLEL COPYING GARBAGE COLLECTION

BACKGROUND

Technical Field

The present invention generally relates to data processing, and more particularly to spin-less work-stealing for parallel copying garbage collection (GC).

Description of the Related Art

In copying Garbage Collection (GC) in Open Java® Development Kit (OpenJDK), work-stealing is used for load balance. Here, a task in work-stealing is an object.

After finishing all the tasks that an owner thread has in its deque (double-ended queue), it starts trying to steal other tasks from other threads' deques.

When a GC thread fails to steal a task multiple times continuously, it transits to another mode. The other mode involves repeating the following steps with another trial of the steal: (1) spin loop and then try to steal a task; (2) yield and then try to steal a task; and (3) sleep and then try to steal a task. When all GC threads' deques become empty, a GC finishes.

However, a spin loop consumes Central Processing Unit (CPU) resources. Hence, there is a need for a spin-less work-stealing for parallel copying garbage collection.

SUMMARY

According to an aspect of the present invention, a computer-implemented method is provided for object copying in a computer performing parallel copying garbage collection on deques using work-stealing. The method includes acquiring, for original objects in a source deque space, a destination deque space to copy the original objects to. The method further includes copying, from the source deque space to the destination deque space, any of the original objects in the source deque space having a reference to other ones of the original objects. The method also includes registering, together with an address to copy to, any of the original objects in the source deque space lacking the reference to the other ones of the original objects. The method additionally includes setting, in the source space, forwarding pointers to copied ones of the original objects in the destination deque place.

According to another aspect of the present invention, a computer-implemented method is provided for object copying in a computer performing parallel copying garbage collection on deques using work-stealing. The method includes acquiring, for original objects in a source deque space, a destination deque space to copy the original objects to. The method further includes copying, from the source deque space to the destination deque space, any of the original objects in the source deque space having a pre-known structure for estimating copy overhead. The method also includes registering, together with an address to copy to, any of the original objects in the source deque space lacking the pre-known structure for estimating the copy overhead. The method additionally includes setting, in the source space, forwarding pointers to copied ones of the original objects in the destination deque place.

According to yet another aspect of the present invention, a system is provided for performing parallel copying garbage collection using work-stealing. The system includes a set of deques. The system further includes a memory configured to store program code. The system also includes a processor, operatively coupled to the deques and the memory, configured to run the program code to acquire, for original objects in a source deque space, a destination deque space to copy the original objects to. The processor is further configured to run the program code to copy, from the source deque space to the destination deque space, any of the original objects in the source deque space having a reference to other ones of the original objects. The processor is also configured to run the program code to register, together with an address to copy to, any of the original objects in the source deque space lacking the reference to the other ones of the original objects. The processor is additionally configured to run the program code to set, in the source space, forwarding pointers to copied ones of the original objects in the destination deque place.

According to still another aspect of the present invention, a system is provided for performing parallel copying garbage collection using work-stealing. The system includes a set of deques. The system further includes a memory configured to store program code. The system also includes a processor, operatively coupled to the deques and the memory, configured to run the program code to acquire, for original objects in a source deque space, a destination deque space to copy the original objects to. The processor is further configured to run the program code to copy, from the source deque space to the destination deque space, any of the original objects in the source deque space having a pre-known structure for estimating copy overhead. The processor is also configured to run the program code to register, together with an address to copy to, any of the original objects in the source deque space lacking the pre-known structure for estimating the copy overhead. The processor is additionally configured to run the program code to set, in the source space, forwarding pointers to copied ones of the original objects in the destination deque place.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Figure 1:
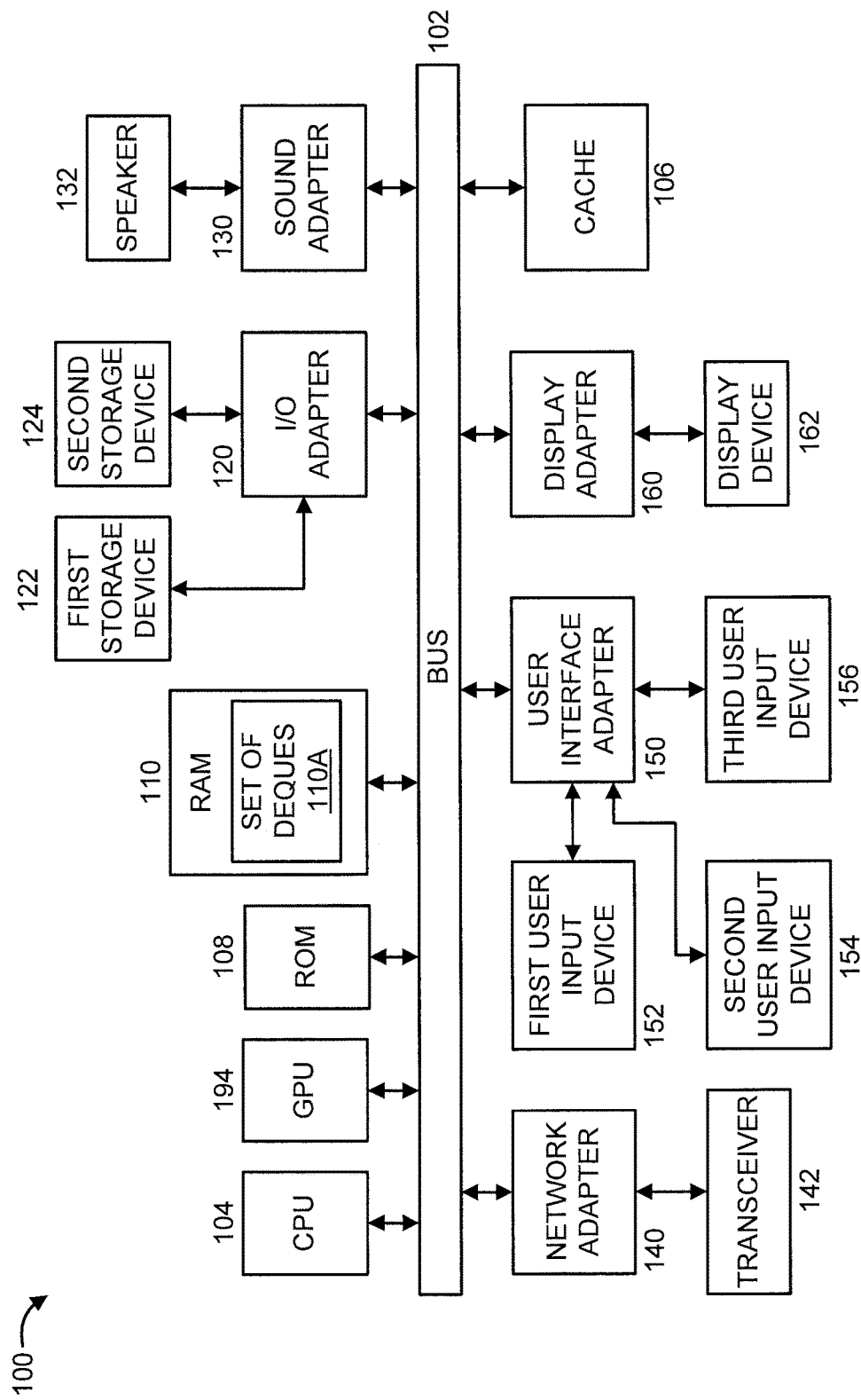
FIG. 1 is a block diagram showing an exemplary processing system to which the present invention may be applied, in accordance with an embodiment of the present invention.

Methods and systems of the present invention are directed to spin-less work-stealing for parallel copying garbage collection (GC).

In an embodiment, implementations of the present invention are configured to avoid performing a spin loop when possible, given the significant computational resources typically involved in performing a spin loop. In this way, a more efficient copying garbage collection can be performed.

Thus, in an embodiment, when a copying GC is implemented by using work-stealing, each GC thread copies registered objects instead of performing a spin loop. In an embodiment, a registered object is stored with the information on where to copy the object.

In an embodiment, an object that is copied instead of spin loop is registered (and thus, delayed being copied) at the time of the parallel copying GC, when the object has no references to other objects or the object structure is well known. For example, the structure of the String object is well known. That is, a String object refers to only a char[ ] object. The point is whether one can easily estimate the overhead of a copy for an object (an object that has no references to other objects or a String object, for example). When a GC thread reaches an object (a), the GC thread cannot easily estimate how many other objects are indirectly referenced from the object (a). Since delaying the copy of an object means the delay is also for the directly/indirectly referenced objects, it is difficult to estimate the total overhead of the copy starting from the object (a). Please note that a GC thread can get the information of how many direct references are from the object (a), while such direct references can also reference others, which are indirect from the object (a). In the case of a String object, we already know that a String object just references a char[ ] object. Hence, one can estimate the total overhead of a delayed copy of String and char[ ] objects. Even if we know an object is immutable (and all the referenced objects are also immutable), the information we want to know is the total overhead of the delayed copy.

All the delayed copies finish by the end of the current GC. However, acquiring a space to copy to and setting a forwarding pointer are not delayed. Setting a forwarding pointer is much heavier computationally than the spin loop.

In an embodiment, the number of copies to be performed instead of a spin loop can be decided based on both the copy cost and the spin count. When the overhead of copying an object is denoted by A, and the overhead for an iteration of a spin loop is denoted by B, a new spin count can be calculated with (original spin count)*B/A. In the preceding equation, "original spin count" can be determined from the loop count such as the variable "max" in "for (i=0; i<max;++i)". The new spin count is the maximum number of copiable objects. In an embodiment, if the actual number of copied objects is less than the new spin count, a virtual machine (VM) executes the original spin loop ((original spin count)−(the number of actually copied objects)*A/B) times.

In an embodiment, an upper limit can be set on the number of registrable objects. It is to be appreciated that without such limit, too many delayed copies could cause a loss of load balance. It is to be further appreciated that the number (upper limit) can be specified using a VM argument. An example of specifying the number (upper limit) via a VM argument is as follows: "−XX:+LazyCopyLimit=256".

In an embodiment, an object with a huge size is not registered (so, that object is not delayed). For example, if the size of an object is more than X bytes or is Y % of the current size of the heap memory, then the object is not registered. This parameter can also be configured via a VM argument such as "−XX:+LazyCopySizePerObject=X" and "−XX:+LazyCopyRatioInHeap=Y".

Hence, copying objects can be delayed as long as the copy finishes by the end of the current GC.

FIG. 1 is a block diagram showing an exemplary processing system 100 to which the present invention may be applied, in accordance with an embodiment of the present invention. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102. At least one Graphics Processing Unit (GPU) 194 is connected to at least the CPU 104 via system bus 102. Any of the CPU 104 and/or the GPU 194 can include one or more cores. In an embodiment, at least one of the CPU 104 and/or the GPU 194 is configured to perform multi-threaded processing. In an embodiment, a portion of the RAM 110 can be used to implement a set of deques 110A. In an embodiment, the set of deques 110A is used to implement a heap. For example, in an embodiment, the set of deques 110A can include two deques, with each deque representing half of the heap. Of course, other numbers of deques and other arrangements can be used, given the teachings of the present invention provided herein, while maintaining the spirit of the present invention.

A first storage device 122 and a second storage device 124 are operatively coupled to system bus 102 by the I/O adapter 120. The storage devices 122 and 124 can be any of a disk storage device (e.g., a magnetic or optical disk storage device), a solid state storage device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of ordinary skill in the art, and may also omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present invention provided herein.

Moreover, it is to be appreciated that system 100 described above with respect to FIG. 1 is a system for implementing respective embodiments of the present invention.

Figure 2:
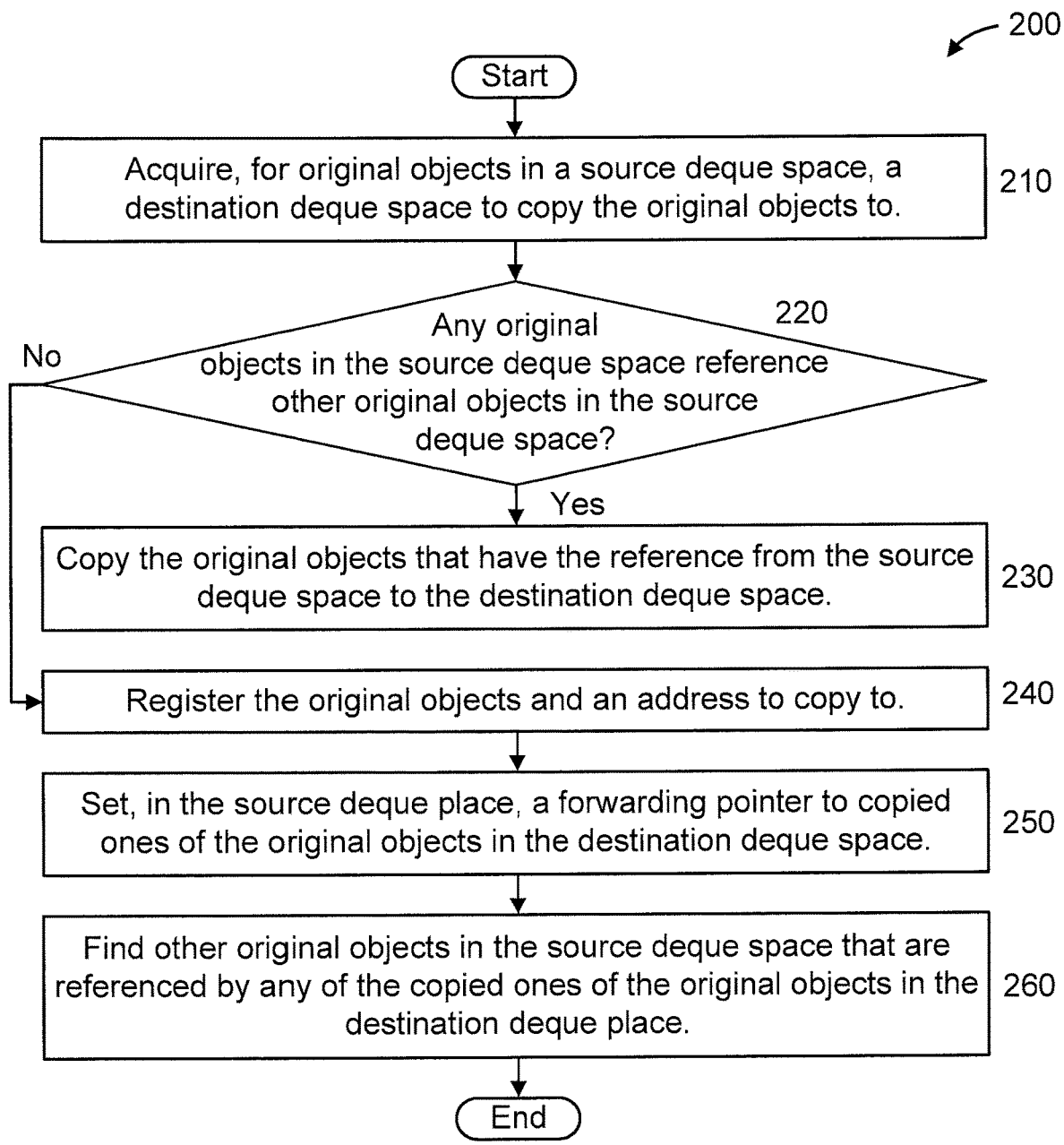
FIG. 2 is a flow diagram showing an exemplary method for object copying in a computer performing parallel copying Garbage Collection (GC) on deques using work-stealing, in accordance with an embodiment of the present invention.
Figure 3:
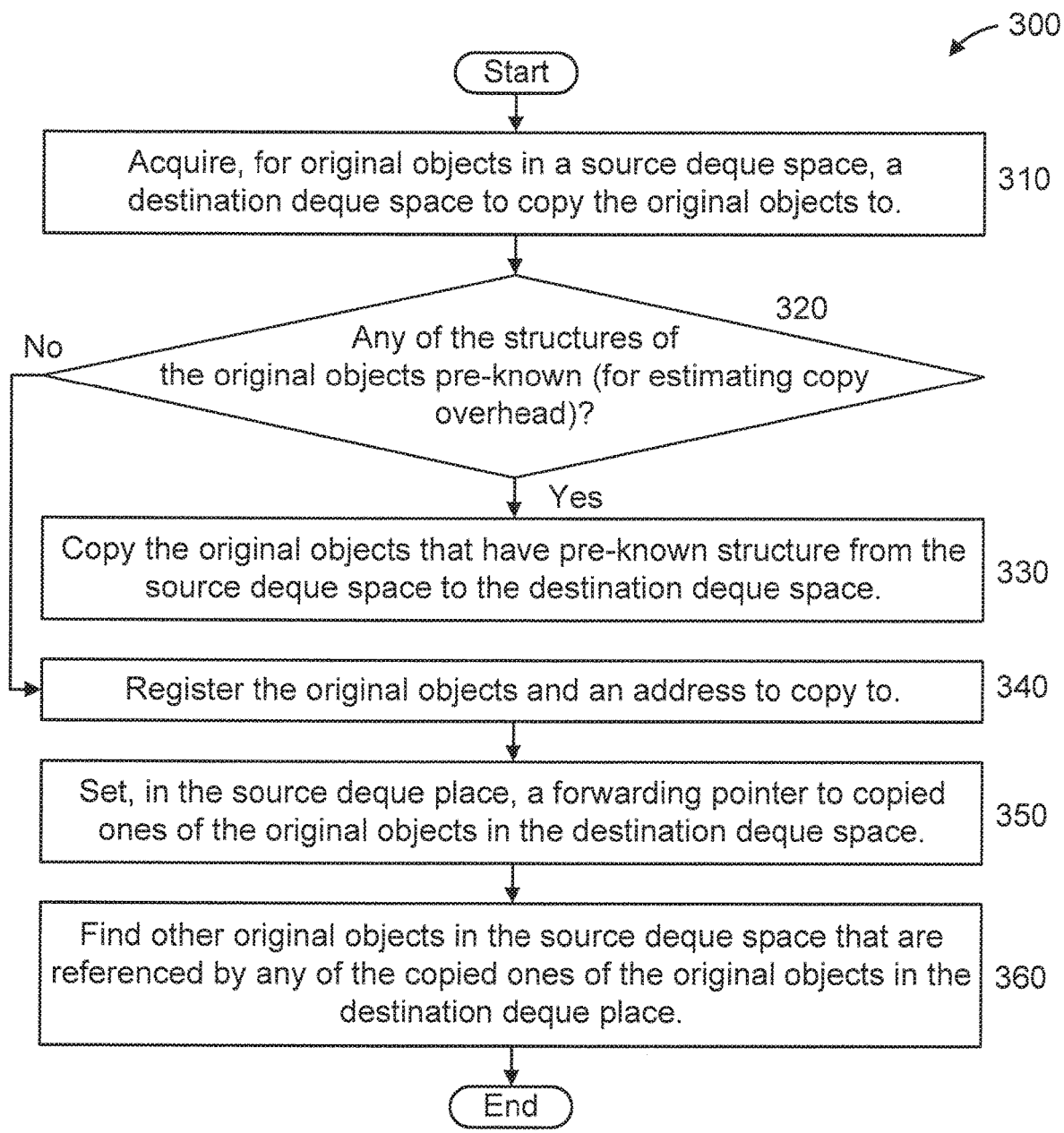
FIG. 3 is a flow diagram showing an exemplary method for object copying in a computer performing parallel copying Garbage Collection (GC) on deques using work-stealing, in accordance with an embodiment of the present invention.
Figure 4:
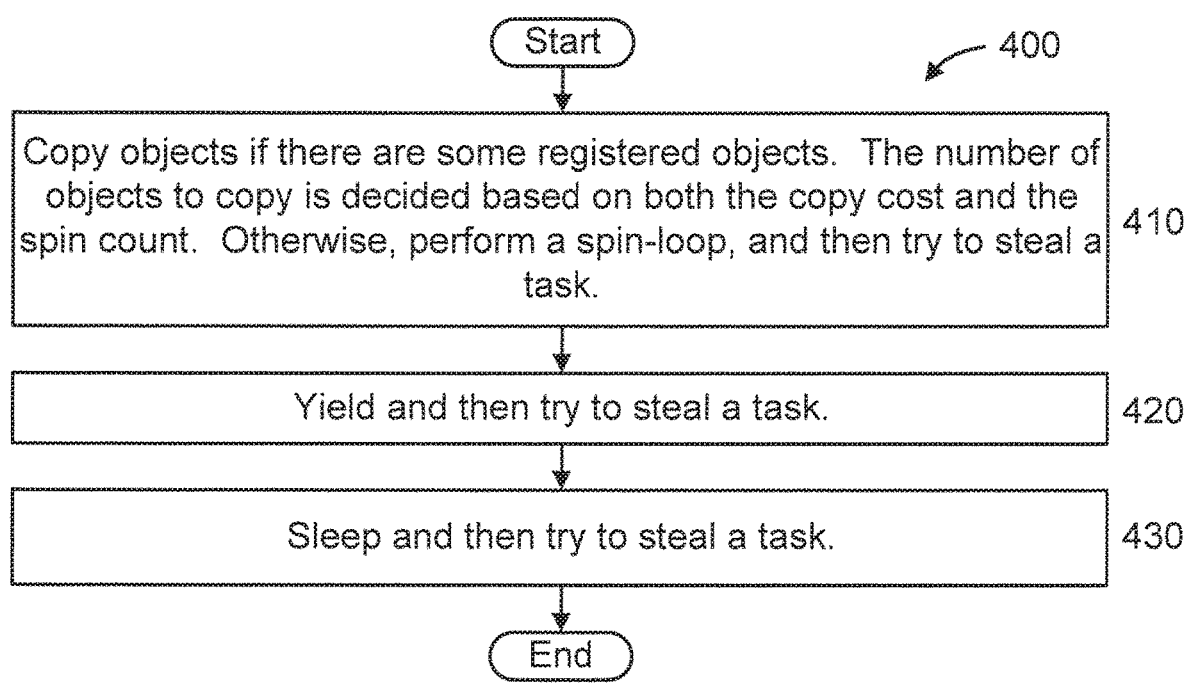
FIG. 4 is a flow diagram showing an exemplary method performed responsive to a GC thread failing to steal a task multiple times continuously, in accordance with an embodiment of the present invention.
Figure 5:
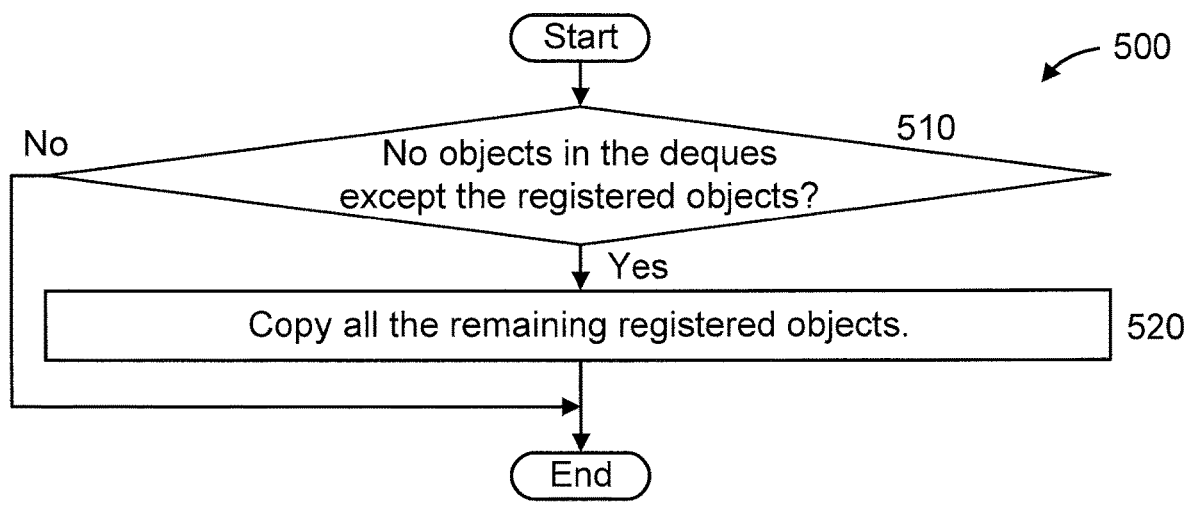
FIG. 5 is a flow diagram showing an exemplary method performed prior to garbage collection termination, in accordance with an embodiment of the present invention.

Further, it is to be appreciated that processing system 100 may perform at least part of the methods described herein including, for example, at least part of method 200 of FIG. 2 and/or at least part of method 300 of FIG. 3 and/or at least part of method 400 of FIG. 4 and/or at least part of method 500 of FIG. 5.

FIGS. 2-6 are flow diagrams showing various exemplary methods in accordance with various embodiments of the present invention. The methods are directed to various aspects of parallel copying Garbage Collection (GC). In an embodiment, the parallel copying GC can involve the use of a set of deques (double ended queues). In an embodiment, the set of deques can be used to implement a heap. In an embodiment of the parallel copying GC, objects are copied from a source deque space to a destination deque space.

In the descriptions of these methods, the term "original object" refers to an object in the source deque space that is to be copied to the destination deque place in the parallel copying GC. Moreover, the term "copied one(s)", usually followed by "of the original object(s)" refers to an object that resides in the destination deque place, having already being copied thereto from the source deque place. Of course, while deques are used for the descriptions of these methods, other data structures can also be used, as readily appreciated by one of ordinary skill in the art, given the teachings of the present invention provided herein, while maintaining the spirit of the present invention.

FIG. 2 is a flow diagram showing an exemplary method 200 for object copying in a computer performing parallel copying Garbage Collection (GC) on deques using work-stealing, in accordance with an embodiment of the present invention. The steps or operations of the method 200 include:

At block 210, acquire, for original objects in a source deque space, a destination deque space to copy the original objects to.

At block 220, check if any of the original objects in the source deque space have a reference to other original objects in the source deque space. If so, then proceed to block 230. Otherwise, proceed to block 240.

At block 230, copy the original objects that have the reference from the source deque space to the destination deque space.

At block 240, register the original objects and an address to copy to. In an embodiment, the registered objects and the corresponding copy to addresses can be stored together in a separate memory structure from the deques or in deque space. Of course, other structures can also be used.

At block 250, set, in the source deque place, a forwarding pointer to copied ones of the original objects in the destination deque space.

At block 260, find other original objects in the source deque space that are referenced by any of the copied ones of the original objects in the destination deque place.

FIG. 3 is a flow diagram showing an exemplary method 300 for object copying in a computer performing parallel copying Garbage Collection (GC) on deques using work-stealing, in accordance with an embodiment of the present invention. The steps or operations of the method 300 include:

At block 310, acquire, for original objects in a source deque space, a destination deque space to copy the original objects to.

At block 320, check if any of the structures of the original objects are pre-known (for estimating copy overhead). If so, then proceed to block 330. Otherwise, proceed to block 340.

At block 330, copy the original objects that have the pre-known structures (for estimating copy overhead) from the source deque space to the destination deque space.

At block 340, register the original objects and an address to copy to. In an embodiment, the registered objects and the corresponding copy to addresses can be stored together in a separate memory structure from the deques or in deque space. Of course, other structures can also be used.

At block 350, set, in the source deque place, a forwarding pointer to copied ones of the original objects in the destination deque space.

At block 360, find other original objects in the source deque space that are referenced by any of the copied ones of the original objects in the destination deque place.

FIG. 4 is a flow diagram showing an exemplary method 400 performed responsive to a GC thread failing to steal a task multiple times continuously, in accordance with an embodiment of the present invention. The steps or operations of the method 400 include:

At block 410, copy objects if there are some registered objects. The number of objects to copy is decided based on both the copy cost and the spin count. Otherwise, perform a spin-loop, and then try to steal a task.

At block 420, yield and then try to steel a task.

At block 430, sleep and then try to steal a task.

FIG. 5 is a flow diagram showing an exemplary method 500 performed prior to garbage collection termination, in accordance with an embodiment of the present invention. The steps or operations of the method 500 include:

At block 510, check if there are no objects in the deques except the registered objects. If so, then proceed to block 520. Otherwise, terminate the method.

At block 520, copy all the remaining registered objects.

The present invention may be a system, a method, and/or a computer program product at any possible technical detail level of integration. The computer program product may include a computer readable storage medium (or media) having computer readable program instructions thereon for causing a processor to implement aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to implement aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, implement the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the functions/acts specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device, implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C).

This may be extended, as readily apparent by one of ordinary skill in this and related arts, for as many items listed.

Having described preferred embodiments of a system and method (which are intended to be illustrative and not limiting), it is noted that modifications and variations can be made by persons of ordinary skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for object copying in a computer performing parallel copying garbage collection on deques using work-stealing, the method comprising:
   acquiring, for original objects in a source deque space, a destination deque space to copy the original objects to;
   copying, from the source deque space to the destination deque space, any of the original objects in the source deque space having a reference to other ones of the original objects;
   registering, together with an address to copy to, any of the original objects in the source deque space lacking the reference to the other ones of the original objects; and
   setting, in the source deque space, forwarding pointers to copied ones of the original objects in the destination deque space.

2. The computer-implemented method of claim 1, further comprising finding other original objects in the source deque space that are referenced by any of the copied ones of the original objects in the destination deque space.

3. The computer-implemented method of claim 1, wherein responsive to an inability to steal work during the work-stealing, the method further comprises:
   copying at least some of the registered objects, if any, wherein a number of copied ones of the registered objects is determined based on a copy cost therefor and a spin count;
   waiting in a spin loop, responsive to a lack of any registered objects; and
   trying to steal a task after the spin loop.

4. The computer-implemented method of claim 3, further comprising:
   determining whether remaining objects in the deques include only registered ones of the original objects;
   copying all the remaining objects in the deques, responsive to the deques including only the registered ones of the original objects; and
   terminating the parallel copying garbage collection responsive to all of the deques used for the parallel copying garbage collection being empty.

5. The computer-implemented method of claim 3, further comprising determining a maximum limit on the number of copied ones of the registered objects as follows:

$$\text{maximum limit} = (\text{spin count}) * B/A,$$

wherein the variable A is a copying overhead, the variable B is a spin loop iteration overhead, and the variable spin count is determined as a variable max in a loop count equation (i=0;i<max;++i).

6. The computer-implemented method of claim 5, further comprising executing the spin loop Y number of times, responsive to an actual number of copied ones of the original objects being less than the maximum limit, wherein the Y number of times is determined as follows:

$$Y = ((\text{spin count}) - (\text{the actual number of copied ones of the original objects}) * A/B).$$

7. The computer-implemented method of claim 1, wherein one of the deques is used to implement the source space to copy the original objects from, and another one of the deques is used to implement the destination space to copy the original object to.

8. The computer-implemented method of claim 1, wherein the registering step imposes a delay on the copying of any of the registered ones of the original objects.

9. The computer-implemented method of claim 1, further comprising imposing an upper limit on a number of the original objects that can be registered in order to prevent a load balance loss.

10. The computer-implemented method of claim 9, wherein the upper limit is specified using a virtual machine argument.

11. The computer-implemented method of claim 1, wherein the registering employs a size constraint such that any of the original objects exceeding a predetermined size limit are prevented from being registered.

12. The computer-implemented method of claim 11, wherein the predetermined size limit is a based on a percentage of a size of a heap of the computer.

13. The computer-implemented method of claim 11, wherein the predetermined size limit is specified using a virtual machine argument.

14. The computer-implemented method of claim 1, wherein the deques are used to implement a heap of the computer.

15. The computer-implemented method of claim 1, wherein the deques are used to perform the parallel copying garbage collection on a heap of the computer.

16. A non-transitory article of manufacture tangibly embodying a computer readable program which when executed causes a computer to perform the method of claim 1.

17. A computer-implemented method for object copying in a computer performing parallel copying garbage collection on deques using work-stealing, the method comprising:
   acquiring, for original objects in a source deque space, a destination deque space to copy the original objects to;
   copying, from the source deque space to the destination deque space, any of the original objects in the source deque space having a pre-known structure for estimating copy overhead;
   registering, together with an address to copy to, any of the original objects in the source deque space lacking the pre-known structure for estimating the copy overhead; and
   setting, in the source deque space, forwarding pointers to copied ones of the original objects in the destination deque space.

18. The computer-implemented method of claim 17, further comprising imposing an upper limit on a number of the original objects that can be registered in order to prevent a load balance loss.

19. A non-transitory article of manufacture tangibly embodying a computer readable program which when executed causes a computer to perform the method of claim 17.

20. A system for object copying in a computer performing parallel copying garbage collection using work-stealing, the system comprising:

a set of deques;

a memory configured to store program code;

a processor, operatively coupled to the deques and the memory, configured to run the program code to acquire, for original objects in a source deque space, a destination deque space to copy the original objects to;

copy, from the source deque space to the destination deque space, any of the original objects in the source deque space having a reference to other ones of the original objects;

register, together with an address to copy to, any of the original objects in the source deque space lacking the reference to the other ones of the original objects; and set, in the source deque space, forwarding pointers to copied ones of the original objects in the destination deque space.

21. The system of claim 20, wherein the processor is configured to run the program code to divide the set of deques into the source deque space and the destination deque space.

22. The system of claim 20, wherein the deques are used to implement a heap of the computer.

23. The system of claim 20, wherein the deques are used to perform the parallel copying garbage collection on a heap of the computer.

24. A system for object copying in a computer performing parallel copying garbage collection using work-stealing, the system comprising:

a set of deques;

a memory configured to store program code;

a processor, operatively coupled to the deques and the memory, configured to run the program code to acquire, for original objects in a source deque space, a destination deque space to copy the original objects to;

copy, from the source deque space to the destination deque space, any of the original objects in the source deque space having a pre-known structure for estimating copy overhead;

register, together with an address to copy to, any of the original objects in the source deque space lacking the pre-known structure for estimating the copy overhead; and set, in the source deque space, forwarding pointers to copied ones of the original objects in the destination deque space.

25. The system of claim 24, wherein the deques are used to implement a heap of the computer.

* * * * *